United States Patent
Gupta et al.

(10) Patent No.: US 11,914,939 B1
(45) Date of Patent: Feb. 27, 2024

(54) CLOCK RE-CONVERGENCE PESSIMISM REMOVAL THROUGH PIN SHARING DURING CLOCK TREE PLANNING

(71) Applicant: Synopsys, Inc., Mountain View, CA (US)

(72) Inventors: Prashant Gupta, Bengaluru (IN); Shibaji Banerjee, Bengaluru (IN); Sivakumar Arulanantham, Hillsboro, OR (US)

(73) Assignee: Synopsys, Inc., Sunnyvale, CA (US)

( * ) Notice: Subject to any disclaimer, the term of this patent is extended or adjusted under 35 U.S.C. 154(b) by 217 days.

(21) Appl. No.: 17/395,361

(22) Filed: Aug. 5, 2021

Related U.S. Application Data

(60) Provisional application No. 63/063,080, filed on Aug. 7, 2020.

(51) Int. Cl.
*G06F 30/396* (2020.01)
*G06F 30/3312* (2020.01)
*G06F 1/06* (2006.01)

(52) U.S. Cl.
CPC .............. *G06F 30/396* (2020.01); *G06F 1/06* (2013.01); *G06F 30/3312* (2020.01)

(58) Field of Classification Search
CPC .. G06F 30/396; G06F 30/3312; G06F 30/302; G06F 1/06
USPC ............................ 716/108, 113, 134; 703/16
See application file for complete search history.

(56) References Cited

U.S. PATENT DOCUMENTS

| | | | | |
|---|---|---|---|---|
| 5,969,744 A * | 10/1999 | Sakashita | ................... | B41J 2/45 |
| | | | | 347/237 |
| 8,572,532 B1 * | 10/2013 | Singh | ...................... | G06F 30/39 |
| | | | | 716/108 |
| 8,593,191 B1 * | 11/2013 | Cooke | ....................... | G06F 1/10 |
| | | | | 327/158 |
| 8,938,703 B1 * | 1/2015 | Saurabh | .............. | G06F 30/3312 |
| | | | | 716/113 |
| 9,709,616 B2 * | 7/2017 | Kalberer | ................ | G01R 31/52 |
| 10,037,394 B1 * | 7/2018 | Kulshreshtha | .......... | G06F 30/30 |
| 10,223,493 B1 * | 3/2019 | Spyrou | ............... | G06F 30/3312 |
| 10,467,365 B1 * | 11/2019 | Kulshreshtha | ...... | G06F 30/3312 |
| 10,860,775 B1 * | 12/2020 | Chow | ................... | G06F 30/396 |
| 10,867,093 B1 * | 12/2020 | Blaine | ..................... | G06F 30/34 |
| 2004/0254776 A1 * | 12/2004 | Andou | .................... | G06F 30/33 |
| | | | | 703/19 |
| 2005/0010884 A1 * | 1/2005 | Lu | ............................. | G06F 1/10 |
| | | | | 716/113 |
| 2005/0050497 A1 * | 3/2005 | Tetelbaum | ............ | G06F 30/396 |
| | | | | 716/113 |
| 2007/0130486 A1 * | 6/2007 | Lindberg | .................. | G06F 1/12 |
| | | | | 713/503 |
| 2009/0243657 A1 * | 10/2009 | Andreev | ............... | G06F 9/3869 |
| | | | | 327/141 |

(Continued)

FOREIGN PATENT DOCUMENTS

JP          04274358 A  *  9/1992

*Primary Examiner* — Phallaka Kik
(74) *Attorney, Agent, or Firm* — Patterson + Sheridan, LLP

(57) ABSTRACT

A method includes receiving a circuit design. The circuit design includes blocks, a clock port, and two or more clock sinks across the blocks. The method further includes determining, by one or more processors, a common clock path between the clock port and the two or more clock sinks across the blocks. Further, the method includes determining a clock latency based on the common clock path.

20 Claims, 12 Drawing Sheets

(56) References Cited

U.S. PATENT DOCUMENTS

| | | | |
|---|---|---|---|
| 2010/0050141 A1* | 2/2010 | Kanno | G06F 30/3312 716/113 |
| 2011/0128051 A1* | 6/2011 | Kumar | G06F 1/08 327/115 |
| 2013/0305078 A1* | 11/2013 | Lee | G06F 1/08 713/500 |
| 2016/0026745 A1* | 1/2016 | Yi | G06F 30/394 716/113 |
| 2016/0026746 A1* | 1/2016 | Yi | G06F 30/394 716/113 |
| 2017/0140089 A1* | 5/2017 | Hathaway | G06F 30/398 |
| 2018/0210986 A1* | 7/2018 | Wu | G06F 30/3312 |
| 2021/0225291 A1* | 7/2021 | Lee | G09G 3/3266 |

\* cited by examiner

CLOCK RE-CONVERGENCE PESSIMISM REMOVAL THROUGH PIN SHARING DURING CLOCK TREE PLANNING

RELATED APPLICATION

This application claims the benefit of U.S. provisional patent application Ser. No. 63/063,080, filed Aug. 7, 2020, which is hereby incorporated herein by reference.

TECHNICAL FIELD

The present disclosure relates to designing integrated circuits, and, more particularly, to clock tree planning for an integrated circuit design.

BACKGROUND

The integrated circuit (IC) chip design process includes optimizing the integrated circuit (IC) chip designs into a flat layout. However, as optimizing IC chip design into a flat layout is processor dependent, in many instances the process of optimizing the IC chip design exceeds the available processor resources, increasing the overall design process time and/or cost. Accordingly, large IC chip designs that exceed the available processor resources are partitioned or designed hierarchically into sub-designs. The sub-regions are optimized individually. As the sub-designs are smaller than the corresponding IC chip design, the processor resources used to process the sub-designs are decreased as compared to the processor resources that may be used to optimize the corresponding IC chip design. A design flow including a budgeting process is used to generate the sub-designs from the IC chip design. During the budgeting process, timing constraints are assigned to the sub-designs so that sub-designs are not over-constrained or under-constrained. The budgeting step is performed based on clock pin placement and latency information of the corresponding IC chip design. In one example, a budget is either pessimistic or optimistic. Further, an incorrect budget may increase the amount of runtime and/or iterations of the corresponding implementation flow.

SUMMARY

In one example, a method includes receiving a circuit design including blocks, a clock port, and two or more clock sinks across the blocks. The method further includes determining, by one or more processors, a common clock path between the clock port and the two or more clock sinks across the blocks. Further, the method includes determining a clock latency based on the common clock path.

In one example, a system includes a memory and a processor coupled to the memory. The processor is configured to receive a design file including blocks, a clock port, and two or more clock sinks across the blocks. The processor is further configured to determine, by one or more processors, a common clock path between the clock port and the two or more clock sinks across the blocks. Further, the processor is configured to determine a clock latency based on the common clock path.

In one example, a non-transitory computer readable medium includes stored instructions, which when executed by a processor, cause the processor to receive a design file including blocks, a clock port, and two or more clock sinks across the blocks. The processor is further caused to determine a common clock path between the clock port and the two or more clock sinks across the blocks. Further, the processor is caused to determine a clock latency based on the common clock path.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure relate to clock re-convergence pessimism removal through pin sharing during clock tree planning.

During processing, integrated circuit (IC) chip designs that exceed the available processor resources are partitioned or designed hierarchically into sub-designs. The sub-designs are individually optimized using decreased processor resources to process the sub-designs as compared to optimizing the complete corresponding IC chip design. In one implementation, the sub-designs are generated using a design flow that includes a budgeting process. The budgeting process includes assigning timing constraints to the different sub-designs. The timing constraints are used during the IC chip design process such that the sub-designs are neither over-constrained nor under-constrained.

The budgeting process is performed based on clock pin placement and latency information associated with the corresponding IC chip design. The budgeting process is performed using netlist information that specifies the placement of different cells within the IC chip design. However, in one or more instances, as the clocks of the netlist information are in an ideal mode, the data paths of the netlist information are un-optimized, and/or clock latencies within the design are unknown. Accordingly, the budgeting process may include multiple iterations, increasing the design process time and processor power requirements.

In the following description, a design process that includes a Clock Tree Planning (CTP) process is described. During the CTP process a common clock path, clock pin placement, and clock latency is estimated. The CTP process determines the location and/or sharing of clock pins and feedthrough pins to reduce clock delay between clock source pins and one or more clock sink (e.g., load or endpoints) pins. Further, the CTP process provides improved correlation between steps within the design process (e.g., the IC chip Design-Planning (DP)) process. For example, the CTP process improves the latency budgeting process, mitigating errors, and reducing runtime and the number of iterations of later steps within the implementation. The clock pin placement and latency information determined by the CTP process is used during the budgeting process to generate accurate constraints that reduce the number iterations, increasing the accuracy of the budgeting process, and to mitigate latency related issues that may arise in later stages of the design process as compared to budgeting processes that rely on idealized or non-optimized delay and clock pin placement information. Accordingly, the budgeting process is improved, decreasing the design process time and processing power requirement.

Figure 1:
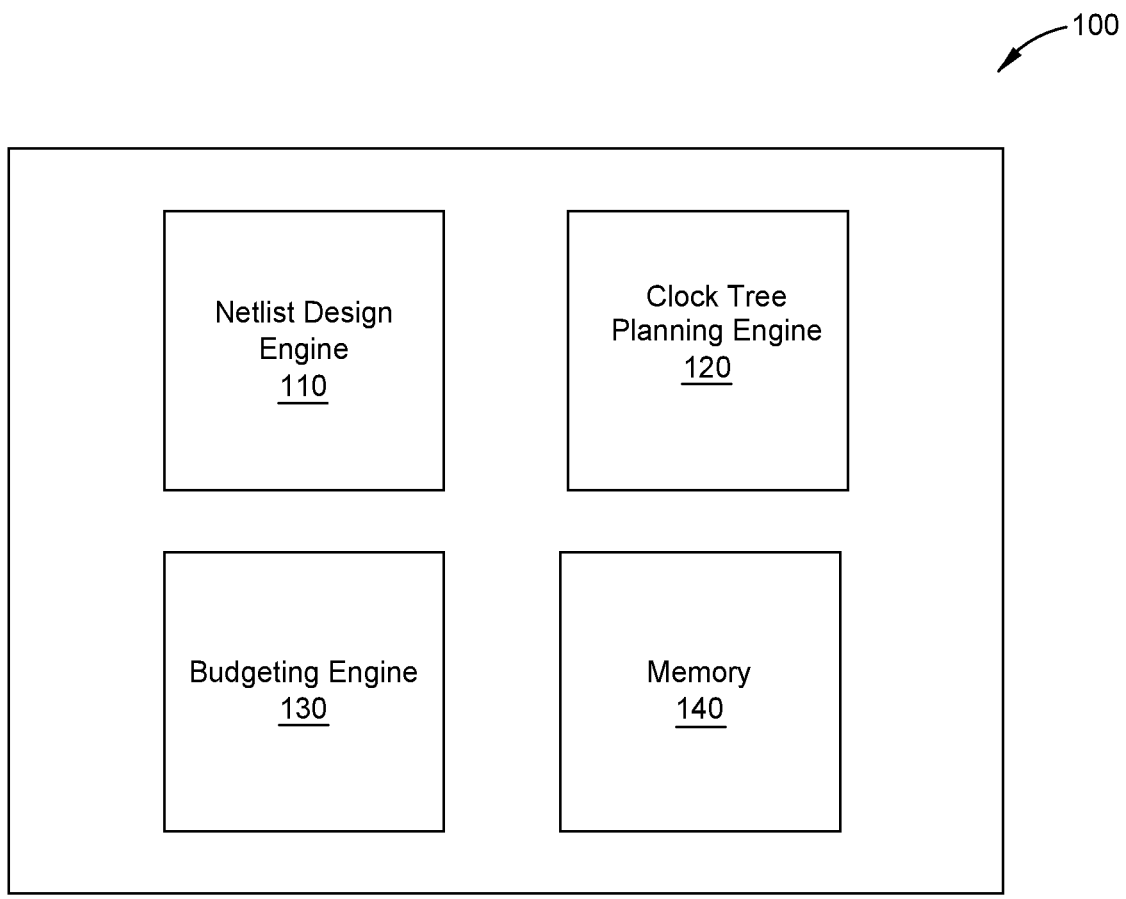
FIG. 1 depicts a block diagram of an electronic design system, according to one or more examples.

FIG. 1 illustrates an electronic design system 100, according to one or more examples. The electronic design system 100 receives an IC design file and generates a netlist design. The electronic design system 100 includes a netlist design engine 110, a clock tree planning (CTP) engine 120, a budgeting engine 130, and a memory 140. In one example, the electronic design system 100 includes one or more processors (e.g., the processing device 1402 of FIG. 14) that execute instructions (e.g., the instructions 1426 of FIG. 14) stored within the memory 140. In one example, the memory 140 is a memory device similar to the main memory 1404 or machine-readable medium 1424 of FIG. 14.

The netlist design engine 110 includes one or more processors (e.g., the processing device 1402 of FIG. 14) that execute instructions (e.g., the instructions 1426 of FIG. 14) stored within the memory 140 to receive an IC chip design and generate netlist information. In one example, the netlist design engine 110 accesses the memory 140 to acquire the IC chip design. Further, the netlist design engine 110 performs a design-planning (DP) process.

In one example, the DP process includes receiving an IC design and reading the design data of the IC design. Hierarchical placement and shaping are performed on the design data to generate a floorplan including a layout of circuit blocks. The shape (e.g., rectangle, L-shape, T-shape, and a rectilinear polygon, among others) of the circuit blocks is selected to generate the floorplan of the IC chip design. The DP process further includes placing buses and stations within the circuit design, and routing the power supply traces within the circuit design. The DP process generates netlist information, or a post-placement netlist including the circuit block layout, the buses, stations, and power supply traces.

The netlist design engine 110 outputs the netlist information to the memory 140. The netlist design engine 110 may additionally, or alternatively, output the netlist information to the CTP engine 120.

The CTP engine 120 includes one or more processors (e.g., the processing device 1402 of FIG. 14) that execute instructions (e.g., the instructions 1426 of FIG. 14) stored within the memory 140 to receive the netlist information, determine a common clock path, and generate latency information. In one example, the CTP engine 120 accesses the memory 140 to acquire the netlist information. In another example, the CTP engine 120 receives the netlist information from the netlist design engine 110.

The CTP engine 120 performs the CTP process on the netlist information to identify one or more common clock paths within the IC chip design. Further, the CTP engine 120 calculates (estimates) a clock latency including a Clock Re-convergence Pessimism Removal (CRPR) values. The CRPR values are used to reduce pessimism in the clock path common to launch and capture flip clock pins of the IC chip design. The CRPR calculation removes pessimism in the clock path. Pessimism in the clock path corresponds to the maximum delay and minimum delay of a clock path shared by a launch and capture flip-flops. For example, the CRPR calculation removes pessimism common to launch and capture flop clock pins.

Figure 2:
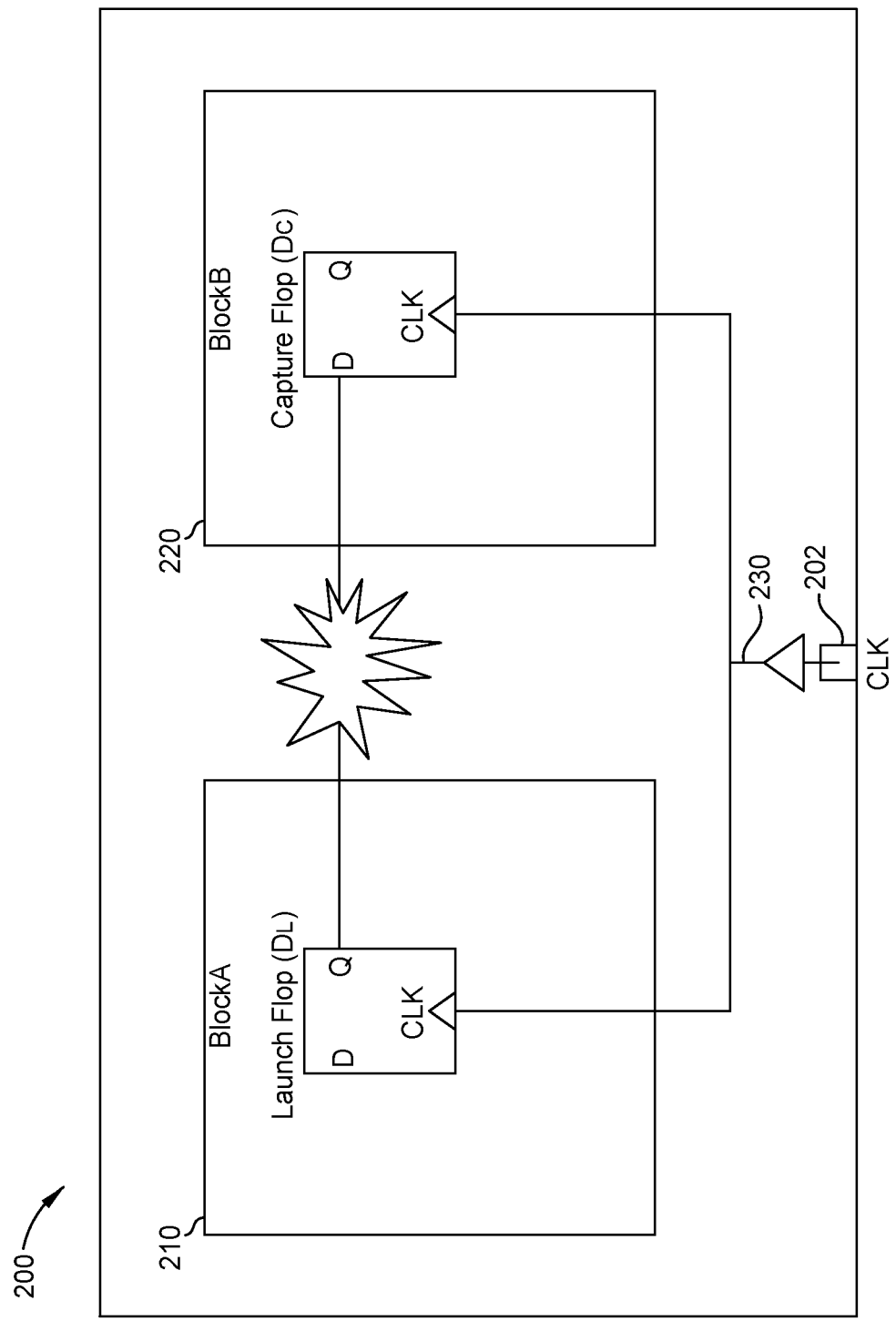
FIG. 2 depicts a block diagram of an example integrated circuit chip design, according to one or more examples.

FIG. 2 illustrates an example IC chip design 200. The CRPR is determined based on the respective clock latencies of the launch flops (DL/CLK) 210 and capture flops (DC/CLK) 220 and the delay at the common point 230. In one example. The CRPR is used to remove the extra pessimism in the clock path common to the launch flops and capture flop clock pins.

The clock tree (e.g., clock network) of the IC chip design 200 corresponds to the path or paths that the clock travels through the circuit blocks (or blocks) 210 and 220 of the IC chip design 200. The clock tree of the IC chip design 200 may also be referred to as the clock network of the IC chip design. In one example, the clock tree corresponds to the clock paths between the clock port (e.g., clock source pin) 202, each of the clock sink pins, and any clock feedthrough pins within the IC chip design 200. In one example, the CTP engine 120 determines a post-physical clock latency that quantifies the "clock-tree potential" of a clock network of the IC chip design 200. In such an example, the clocks are not implemented, and the "clock-tree potential" is an estimation of the IC clock network. The clock tree potential is used to facilitate accurate timing budgets by the budget engine 130 without making significant changes to the netlist of the IC chip design.

In one example, the CTP process includes determining one or more common clock paths within the IC chip design by determining the location and sharing of clock pins and/or feedthrough pins. The CRPR values of the common clock path are used to improve a budgeting process. In one example, a common clock path offsets the On-Chip-Variation (OCV) estimation pessimism by making budget paths longer. OCV compensates for variations due to process, voltage, and temperature variation by adjusting the timing margins within the timing analysis.

In one example, the clock latency is estimated (determined) based on the physical layout of the IC chip design, the clock tree synthesis constraints, and timing derating values. In one example, the timing derate values characterize the expected variation in the propagation delay through a circuit block of the IC chip design. For example, the derate values identify a variance, standard deviation, or other value representing the expected variation in the expected delay. Further, the derate values additionally, or alternatively, indicate maximum or minimum values for the delay.

Figures 11, 12:
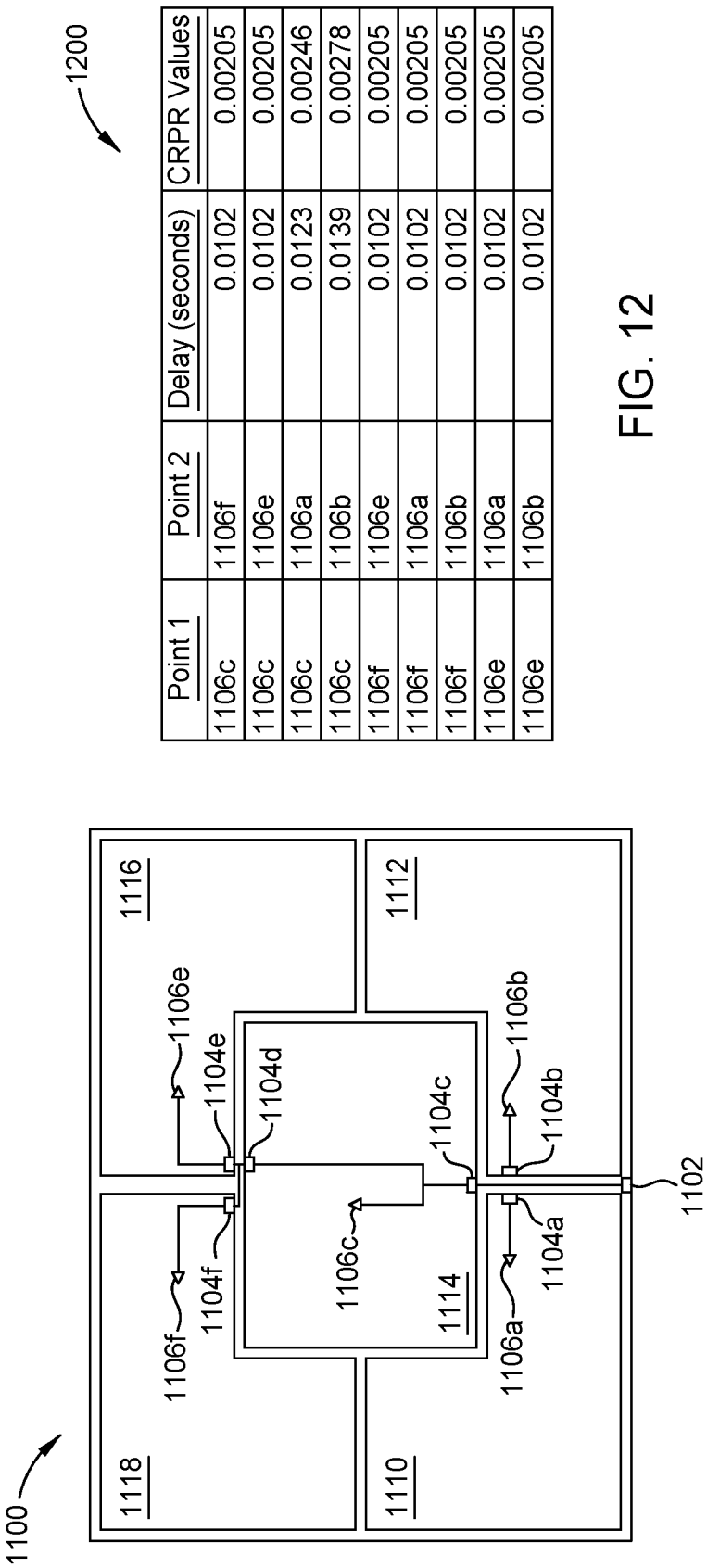
FIG. 11 illustrates an example clock network, according to one or more examples.
FIG. 12 illustrates example latency information, according to one or more examples.

In one example, the clock latency, e.g., the delay and CRPR values, is determined by the CTP engine 120 is stored within the memory 140. Additionally, or alternatively, the CTP engine 120 communicates the estimated clock latency to the budgeting engine 130. FIG. 12 illustrates a table 1200 of example latency information that may be stored in the memory 140.

The budgeting engine 130 includes one or more processors (e.g., the processing device 1402 of FIG. 14) that execute instructions (e.g., the instructions 1426 of FIG. 14) stored within the memory 140 to receive the CRPR values and latency information. In one example, the budgeting engine 130 accesses the memory 140 to acquire the latency information. In another example, the budgeting engine 130 receives the latency information from the CTP engine 120.

The budgeting engine 130 performs a budgeting process using the latency information to calculate a budget for the IC chip design. As the clock latency estimated (determined) by the CTP engine 120 is determined based on the physical layout of the IC chip design, the timing derating values and the number of iterations of the budgeting process. Accordingly, the time spent and processing power used during the budgeting process is reduced. Further, the accuracy of the budgets generated by the budgeting engine 130 is increased. In one example, the budget calculated by the budgeting engine 130 is used to generate the timing constraints for the sub-designs of an IC chip design, which are used in the implementation flow for each sub-design.

Figure 3:
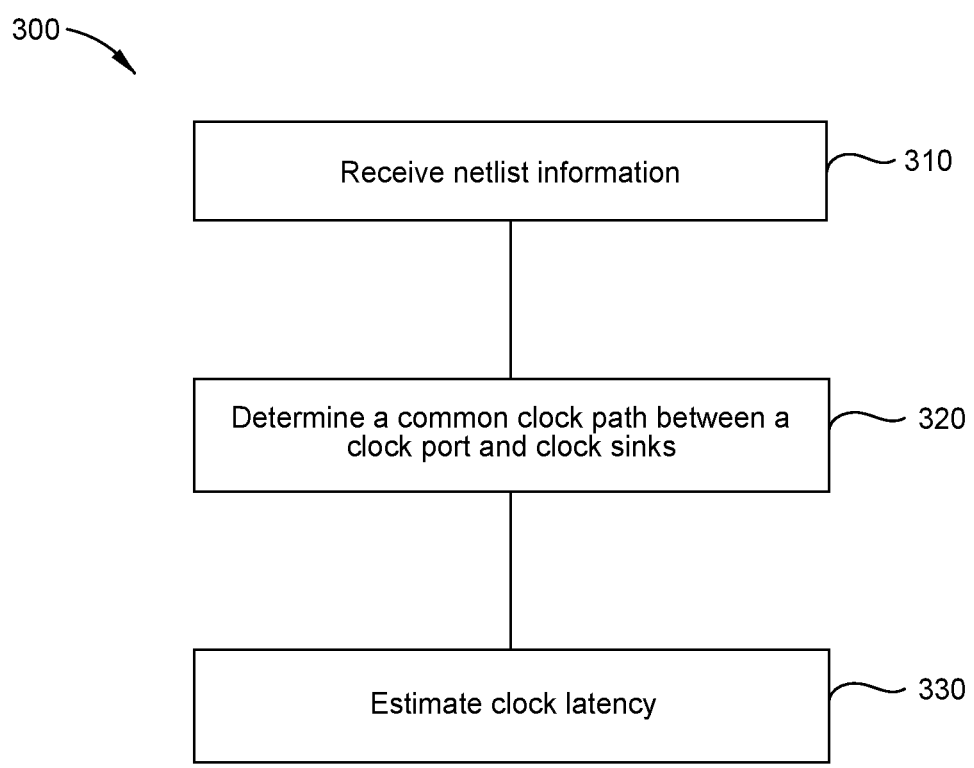
FIG. 3 depicts a flowchart of a method for estimating a clock latency, according to one or more examples.

FIG. 3 illustrates a flowchart of a method 300 for generating a latency information for an IC chip design, according to one or more examples. The method 300 is performed by the CTP engine 120. For example, one or more processors of the CTP engine 120 executes instructions stored within the memory 140 to perform the method 300. In one example, the method 300 is completed as part of the process design planning 1322 of FIG. 13.

At block 310, netlist information is received. The netlist information includes a post-placement netlist. The post-placement netlist is generated by netlist design engine 110 from an IC chip design. In one example, the CTP engine 120 receives the netlist information from the netlist design engine 110. Additionally, or alternatively, the CTP engine 120 accesses the memory 140 to acquire the netlist information.

Figure 8:
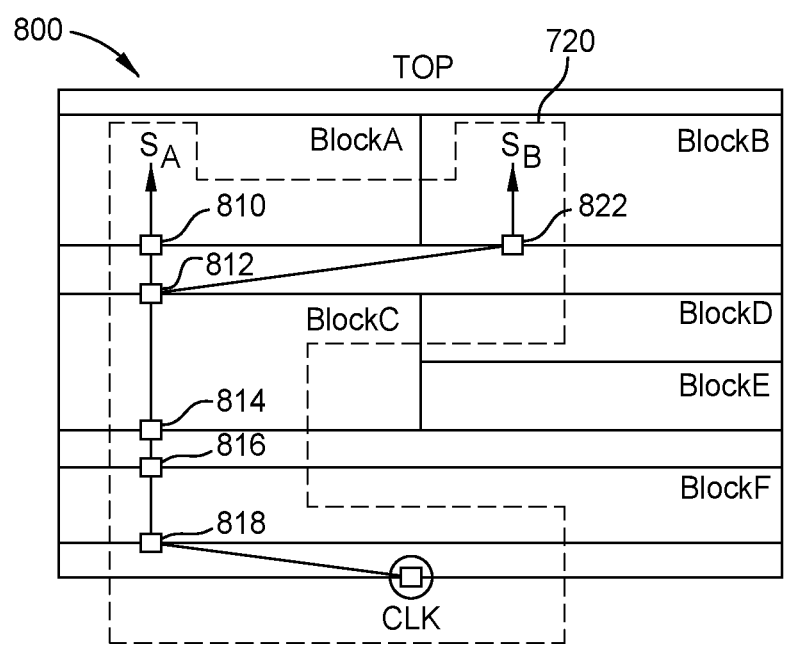
FIG. 8 depicts an example clock network, according to one or more examples.

At block 320, a common clock path between a clock port and two or more clock sinks is determined. A common clock path is a clock path that includes a clock port, two or more clock sinks, and at least one common pin. As will be described in more detail in the following, FIG. 8 illustrates the common clock path 720 that includes the clock port CLK, clock sinks SA and SB, and common feedthrough pin 812. In one example, the CTP engine 120 determines the common clock path between the clock port and two or more clock sinks the netlist information.

At block 330, clock latency is estimated based on the common clock path. For example, the CTP engine 120 estimates the clock latency based on the common clock path. The clock latency may be stored in the memory 140. Additionally, or alternatively, the clock latency is communicating to the budgeting engine 130 which generates a budget based on the estimated clock latency.

Figure 4:
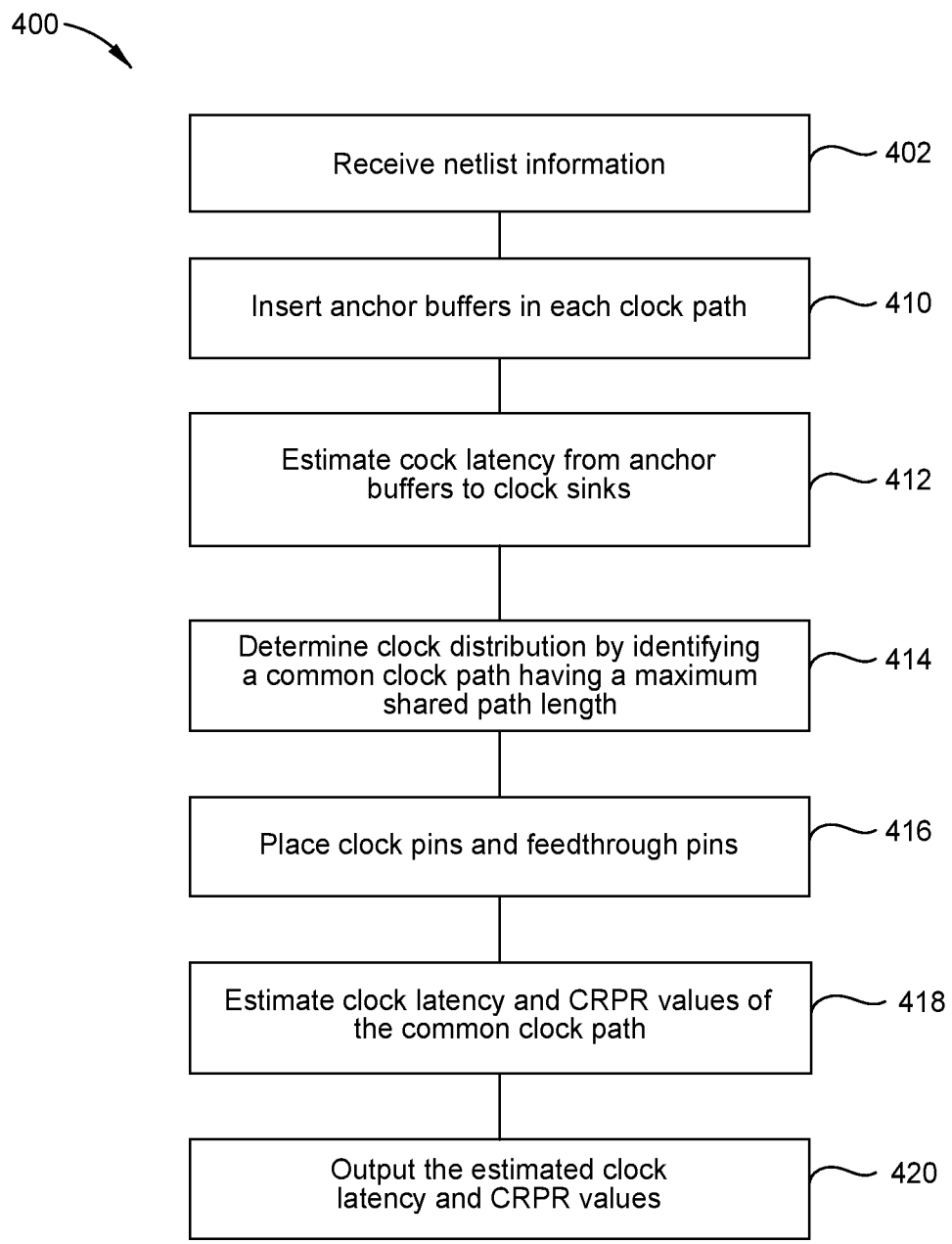
FIG. 4 depicts a flowchart of a method for estimating a clock latency, according to one or more examples.

FIG. 4 is a flowchart of a method 400 for generating a common clock path having reduced latency and corresponding CRPR values, according to one or more examples. In one example, the method 400 is performed by the CTP engine 120 of FIG. 1. For example, one or more processors of the CTP engine 120 executes instructions stored within the memory 140 to perform the method 400. Further, the method 400 may be completed as part of the process design planning 1322 of FIG. 13. In the following, blocks 410 and 412 may be performed on a sub-design.

At block 402, netlist information is received. The CTP engine 120 receives the netlist information. In one example, the CTP engine 120 receives the netlist information from the netlist design engine 110. In another example, the CTP engine 120 accesses the memory 140 to acquire the netlist information stored within the memory 140. The netlist information may be a post-placement netlist. The post-placement netlist includes circuit components placed in the respected locations within the IC chip area. In one example, the post-placement netlist is generated by the netlist design engine 110 by placing the corresponding circuit components within the IC chip area. In one example, the netlist design engine 110 performs one or more optimizations while placing the circuit components within the IC chip area. In one example, receiving the netlist information comprises receiving a design file including circuit blocks (e.g., blocks), a clock port, and two or more clock sinks across the circuit blocks.

At block 410, anchor buffers are inserted in each clock path. For example, the CTP engine 120 inserts one or more anchor buffers within one or more clock paths of the clock network. The anchor buffers are inserted within a clock path at a position where a clock signal is received within a portion of an IC chip design. At block 412, the clock latency from the anchor buffers to clock sinks is determined. The CTP engine 120 determines the clock latency from the anchor buffers and the clock sinks. In one example, the CTP engine 120 determines the clock latency between anchor buffers and each associated clock sink. Further, as the clock latency is associated with the length of a clock path, the clock latency is determined by determining a length of the clock path between an anchor buffer and a clock sink. In one example, blocks 410 and 412 are performed on a sub-design. In such an example, the clock latency is determined from an anchor buffer to a clock sink in a sub-design.

At block 414, clock distribution is determined by identifying a common clock path that has a maximum shared path length. A common path includes at least two clock sinks connected to a common point or pin (e.g., a feedthrough pin or other pin of a clock network). In one example, a clock distribution engine of the CTP engine 120 determines the clock network by identifying a common clock path. Further, the clock distribution engine of the CTP engine 120 locates the clock pins based on the common clock path. The location of the clock pins is determined based on a common path that has the maximum (e.g., longest) shared path length for the corresponding sink pins.

Figure 5:
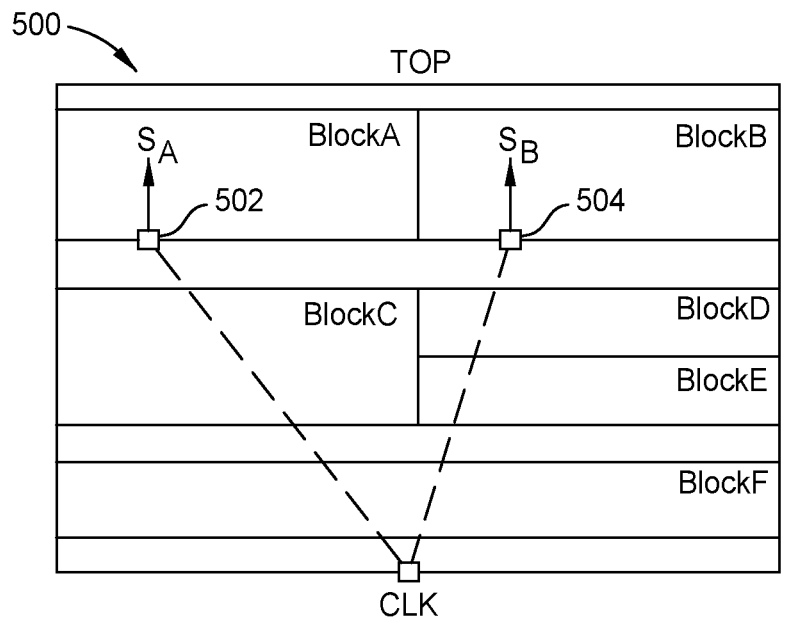
FIG. 5 depicts an example clock network, according to one or more examples.

FIG. 5 illustrates an example IC chip design 500. The IC chip design 500 includes circuit blocks Block A-Block F, clock sinks SA and SB, and clock port CLK. The clock sinks SA and SB are located within Block A and Block B, respectively. In other examples, an IC chip design may have more than two clock sinks in two or more blocks. The sink point SA is connected to the clock pin 502 of the Block A, and the sink point SB is connected to the clock pin 504 of the Block B. In one example, the first clock path includes the clock port CLK, Block F, the Block C, the clock pin 502, and the clock sink SA of Block A. Further, a second clock path includes the clock port CLK, the Block F, the Block E, the Block D, the clock pin 504 and the clock sink SB of the Block B.

Figure 6:
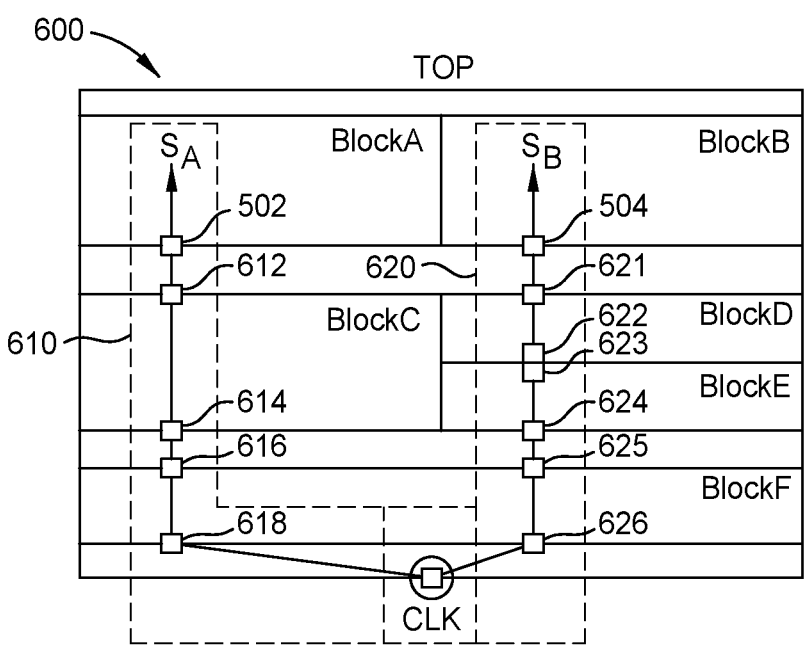
FIG. 6 depicts an example clock network, according to one or more examples.

FIG. 6 illustrates an example clock path 610 between the clock port CLK and the clock pin 502 and the clock sink SA, and an example clock path 620 between the clock port CLK and the clock pin 504 and the clock sink SB.

The clock path 610 includes feedthrough pins 612 and 614 formed in the Block C and feedthrough pins 616 and 618 formed in the Block F. The clock path 620 includes feedthrough pins 621 and 622 formed in Block D, feedthrough pins 623 and 624 formed in Block E, and feedthrough pins 625 and 626 of Block F. The feedthrough pins provide a pathway for a clock signal to travel from the clock port CLK to the clock pins 502 and 504. As can be seen from FIG. 6, the clock paths 610 and 620 are parallel to each other. In one example, the clock paths 610 and 620 may be reconfigured such that there is a shared common pin, forming a common clock path. For example, feedthrough pin 612 may be coupled to clock pin 502 and pin 504 and/or the feedthrough pin 621 may be coupled to clock pin 502 and 504, forming respective common clock paths. However, as will be described with regard to FIGS. 7A-7B, the common clock path comprising the feedthrough pin 612 has less total feedthrough pins than the common clock path comprising the feedthrough pin 621, providing a common clock path less variable delay improving the budget determining process. Further, the use of a common clock path having less total feedthrough pins reduces the manufacturing cost of the final IC chip as less feedthrough pins are used within the final IC chip.

Figure 7A:
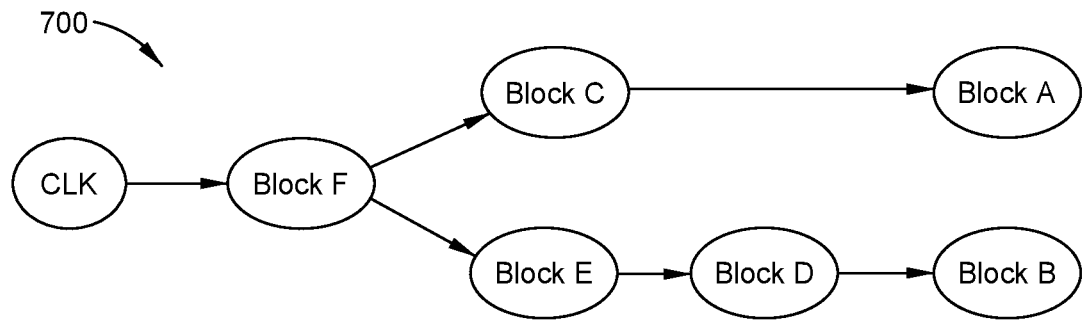
FIG. 7A depicts an example graph of a clock network, according to one or more examples.

FIG. 7A illustrates a graph 700 representing the IC design 600. The graph 700 illustrates a simplified version of the clock paths 610 and 620 of FIG. 6 between the clock port CLK and the Block A and between the clock port CLK and the Block B. The graph 700 represents the blocks, e.g., Block A-Block F, as corresponding vertices. The connections between the vertices corresponds to the connections between adjacent ones of the blocks Block A-Block F. The graph 700 is a directed rooted graph in which one vertex has been designated the root. In the graph 700, the clock port CLK is the root. The edges of the graph 700 are assigned away from root (e.g., towards clock sink pins) and correspond to each of the blocks Block A-Block F. In one example, the connection between each of the adjacent vertices (e.g., each of the blocks) have an associated weight. The weight of each edge is equal to number of feedthrough pins utilized to establish the connection between adjacent vertices (e.g., blocks).

As is illustrated by FIG. 6, the clock path 610 is formed between the clock sink SA within the Block A and the clock port CLK. With regard to FIG. 7A, the clock path 610 corresponds to the vertices CLK, Block F, Block C, and Block A. Further, as is illustrated by FIG. 6, the clock path 620 is formed between the clock sink SB within the Block B and the clock port CLK. With regard to FIG. 7A, the clock path 620 corresponds to the vertices CLK, Block F, Block E, Block D, and Block A.

Figure 7B:
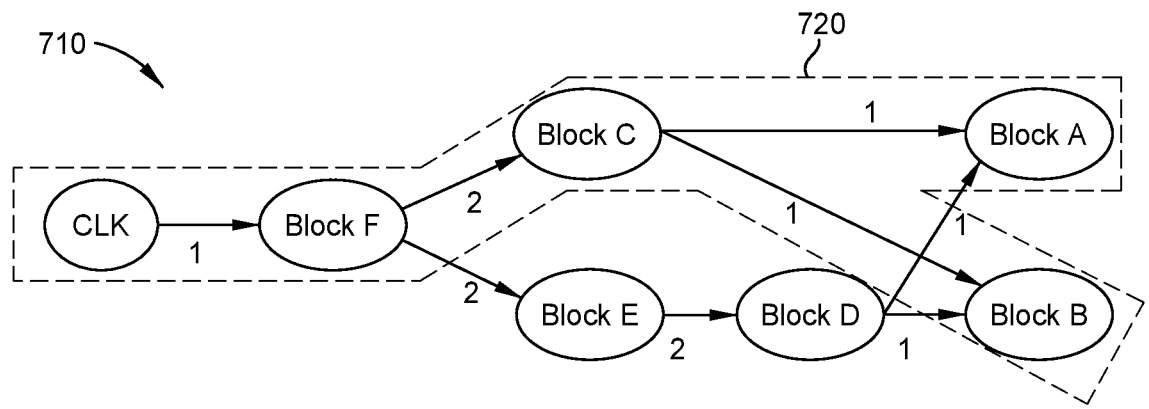
FIG. 7B depicts an example graph of a clock network, according to one or more examples.

FIG. 7B illustrates the graph 710 with weights for each connection between adjacent vertices, or blocks. For example, the weight between the Block C and the Block A is 1. Further, the weight between the Block F and the Block C is 2. The weight between the adjacent blocks corresponds to the number of feedthrough pins that are used to connect the adjacent blocks. Accordingly, one feedthrough pin connects Block C with the Block A, and two feedthrough pins connect the Block F with the Block C.

In one example, the graph 710 and the corresponding weights are analyzed by the clock distribution engine of the CTP engine 120 to identify a common clock path between the clock port (e.g., clock source) CLK and the clock sink SA in the Block A and the clock sink SB in the Block B having a lowest weight (e.g., a lowest number of total feedthrough pins) and a maximum shared path length as compared to all other common paths.

As is illustrated by the graph 710, a connection exists between the Block C and Block A, between Block C and Block B, between Block D and Block A, and between Block D and Block A. Accordingly, two different common clock paths are illustrated by graph 710. A first common clock path includes the CLK vertex (e.g., clock port CLK), vertex Block F, vertex Block C, vertex Block A, and vertex Block B. A second common clock path includes the CLK vertex (e.g., clock port CLK), vertex Block F, vertex Block E, vertex Block D, and vertex Block A.

By analyzing the corresponding weights of each of the first and second common clock paths, the common clock path having the lowest weight (e.g., the lowest number of feedthrough pins) is selected. For example, the first common clock path (e.g., the common clock path 720) has a weight of 4 between the clock port CLK and Block A and Block B. Further, the second clock path has a weight of 7 between the clock port CLK and the Block A and a weight of 6 between the clock port CLK and the Block B. Accordingly, the clock distribution engine of the CTP engine 120 selects the first common clock path (e.g., the common clock path 720). The common clock path 720 has improved CRPR values as compared to the clock paths 610 and 620 of FIG. 6. Further, the common clock path 720 maximizes the shared path length between the clock port CLK and clock sinks SA and SB, as the common clock path 720 passes through the maximum number of blocks before connecting the clock sinks SA and SB of Block A and Block B, respectively. For example, the shared connection point is Block C that is positioned immediately before the Block A and the Block B, generate a common clock path with a longest shared path.

FIG. 8 illustrates a clock network 800 including the common clock path 720 of FIG. 7B. The clock network 800 is generated by the clock distribution engine of the CTP engine 120 based on the common clock path 720. The clock pin 810 is part of Block A, the feedthrough pins 812 and 814 are part of Block C, the feedthrough pins 816 and 818 are part of Block F, and the clock pin 822 is part of Block B. The feedthrough pin 818 is connected to the clock port CLK, the feedthrough pin 816 is connected to the feedthrough pin 814, and the feedthrough pin 812 is connected to the clock pin 810 and the clock pin 822. The clock pin 810 is connected to the clock sink SA, and the clock pin 822 is connected to the clock sink SB. As illustrated by the clock network 800, the feedthrough pin 812 of the Block C is shared and connected to both of the pins 810 and 822. Further, the feedthrough pins 812-818 are created based on the common clock path 720.

With further reference to method 400 of FIG. 4, at block 416, the clock pins and feedthrough pins are placed within IC chip design. A clock pin placement engine of the CTP engine 120 places the clock pins and the feedthrough pins to form the clock network of the IC chip design. The clock pin placement engine of the CTP engine 120 places the clock pins and feedthrough pins based on the common clock path determined at block 414. For example, the clock pin placement engine of the CTP engine 120 places the feedthrough pins 812-828 and clock pins 810 and 822 of FIG. 8.

At block 418, a clock latency and CRPR values of a common clock path are determined. In one example, the latency engine of CTP engine 120 determines the clock latency and CRPR values of the common clock path 720 of FIG. 7B and FIG. 8. In one example, the clock latency and CRPR values are determined as described in method 900 of FIG. 9.

Figure 9:
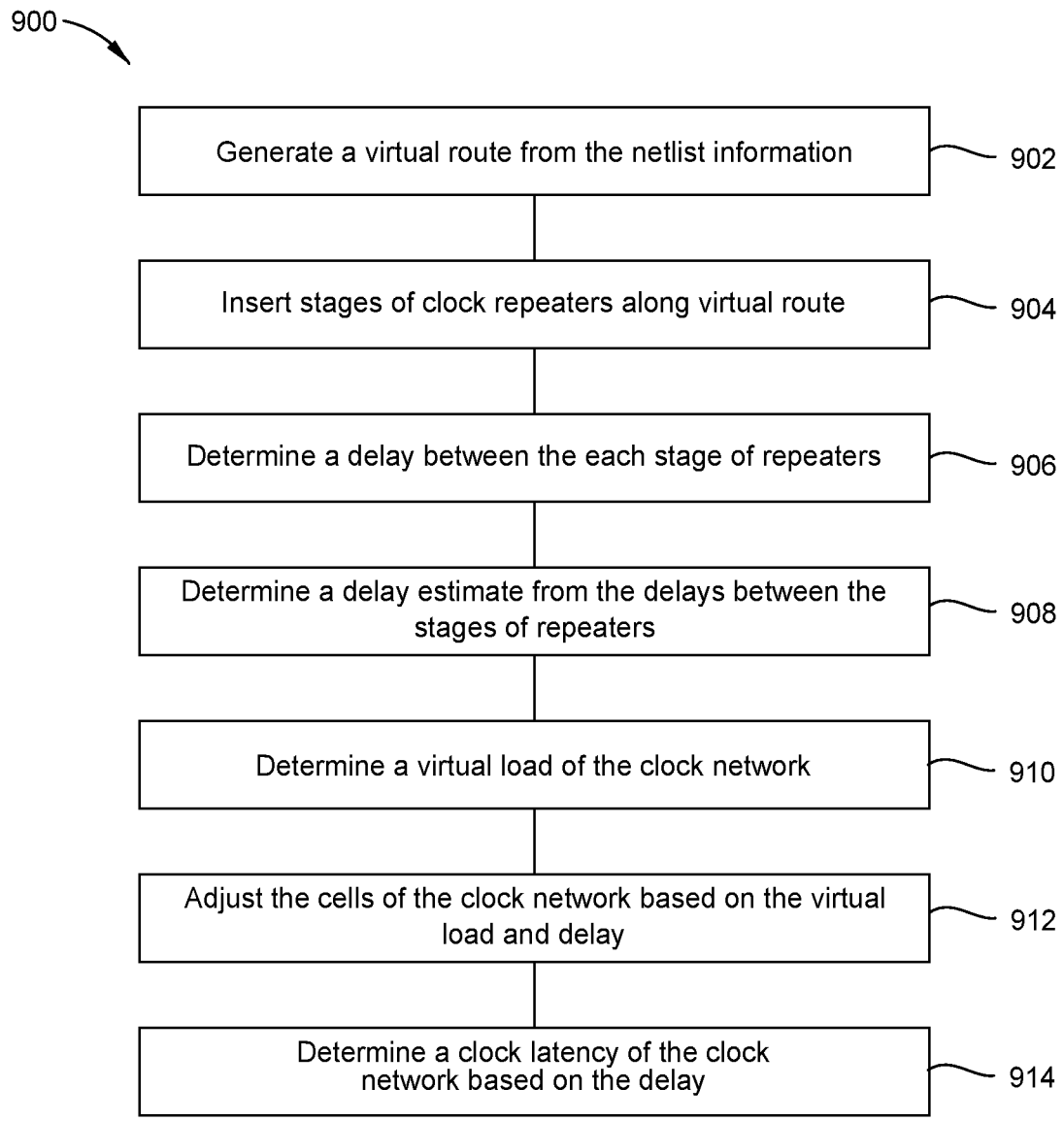
FIG. 9 depicts a flowchart of a method for estimating a clock latency of a clock network, according to one or more examples.

FIG. 9 illustrates a flowchart of a method 900 for a estimating clock latency, according to one or more examples. The clock latency is estimated by a latency engine of the CTP engine 120 of FIG. 1. For example, one or more processors of the CTP engine 120 executes instructions stored in the memory 140 to perform the method 900. At block 902, one or more virtual routes are generated from the netlist information. At virtual router of the latency engine of the CTP engine 120 generates the virtual routes based on placement and routing blockages within the net(s) of the netlist information. At block 904, stages of clock repeaters are inserted along the virtual route or routes. In one example, the latency engine of the CTP engine 120 inserts clock repeaters at a specified distance from each other along the virtual routes. Each of the clock repeater has an input that receives a clock signal and one or more outputs that output the repeated clock signal.

At block 906, the delay between each stage of clock repeaters along the one or more virtual route is determined. At block 908, delays are estimated based on the delays between each stage of the clock repeaters. In one example, the CTP engine 120 determines the delay based on the delays between each stage of the clock repeaters. Further, the CTP engine 120 determines a post-physical clock tree synthesis (CTS) timing based on the delay. The CTS is a process that ensures the clock signal is evenly distributed to all sequential elements in the corresponding IC chip design. In one example, during the CTS process, buffers or inverters are inserted along the clock paths of the clock network to mitigate skew within the clock network. At block 910, a virtual load of the clock network is determined.

At block 912, the circuit blocks of the clock network are adjusted based on the virtual load and delay. The CTP engine 120 adjusts the circuit blocks of the clock network based on the virtual load and delay. At block 914, clock latency of the clock network is determined. The CTP engine 120 determines the clock latency for the clock network based on the delays of the clock network. In one example, the CTP engine 120 determines multiple iterations of the clock network and determines the latency information for each iteration of the clock network. For each iteration, varies the repeater chain insertion and/or the size of the gates and simulates, or models, the effect of a repeater chain insertion or sizing of the gate.

In one example, CRPR values are determined from a common clock path or paths as described with regard to FIGS. 7A and 7B, and calculating CRPR values. For example, the latency engine of the CTP engine 120 estimates CRPR values by summing delay from the clock port to a common pin along the clock paths. For example, with reference to FIG. 8, the CRPR values are determined from the clock port CLK to the shared feedthrough pin 812. The estimated latency and CRPR values are correlated with post-physical CTS values.

In one example, the latency engine of the CTP engine 120 accesses the memory 140 to retrieve the delay values for each feedthrough pin of the clock paths. The latency engine of the CTP engine 120 sums the delays received the memory 140 to determine the delay portion of the latency information for each clock path. In one example, the CRPR value at the shared pin (e.g., the feedthrough pin 812 of FIG. 8) within the clock network is determined based on a sum of the delays from clock port (e.g., the clock port CLK) to the shared pin (e.g., the feedthrough pin 812). The clock path delay is multiplied with a factor based on difference between timing derate late and timing derate early to determine the CRPR values. In one example, the CRPR values are determined based on equation 1.

$$CRPR_{pin812} = latency_{pin812} \times (\text{timing derate late} \times \text{timing derate early}) = (\text{delay between clock port CLK and pin } 812) \times (\text{timing derate late} - \text{timing derate early}) \quad \text{Equation 1}$$

In one example, the latency and CRPR values are communicated to the budgeting engine 130 for further processes to generate a budget. In one example, the latency information is stored in the memory 140 and is accessible by the budgeting engine 130. Example clock latency and CRPR values is illustrated by table 1200 of FIG. 12.

With further reference to the method 400 of FIG. 4, at block 420, the estimated clock latency is output. Further, the CRPR values are output. The CTP engine 120 stores the clock latency and the CRPR values in the memory 140. Additionally, or alternatively, the CTP engine 120 communicates the clock latency and the CRPR to the budgeting engine 130. The budgeting engine 130 accesses the memory 140 to acquire the clock latency and CRPR values and/or receives the clock latency and CRPR from the CTP engine 120.

One or more processors of the budgeting engine 130 executes instructions stored within the memory 140 to determine the budget for the corresponding IC chip design. Determining the budget for the corresponding IC chip design determines timing budgets for the clock paths and other data paths within the IC chip design. The timing budgets are used by the IC chip design process to design the circuit blocks or functional modules.

Figure 10:
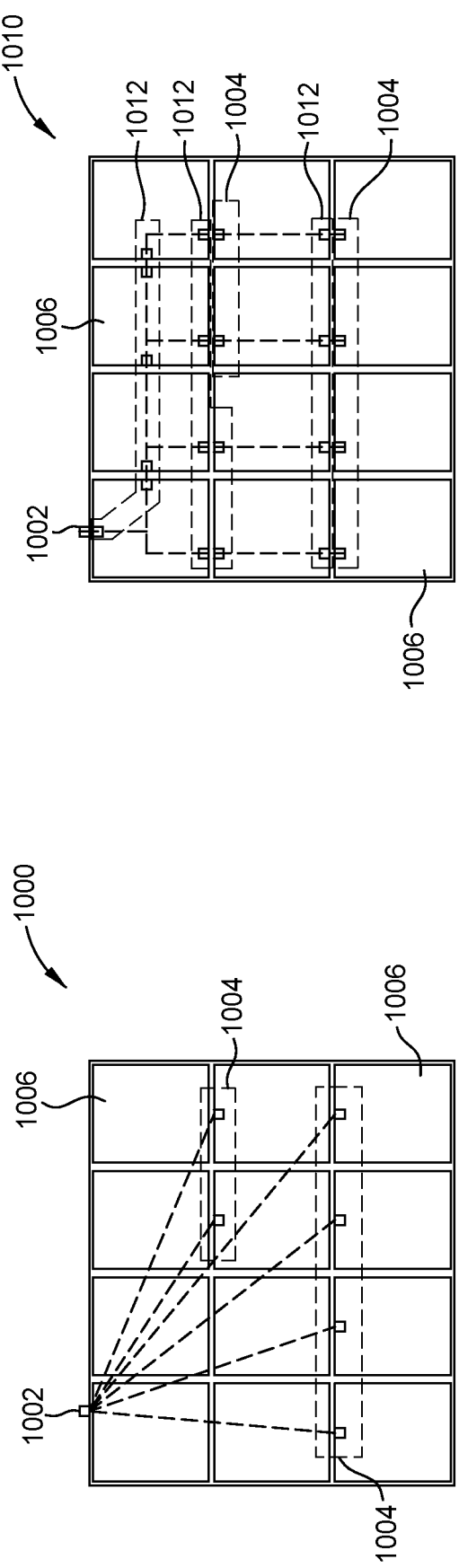
FIG. 10 illustrates an example clock networks, according to one or more examples.
Figure 10:
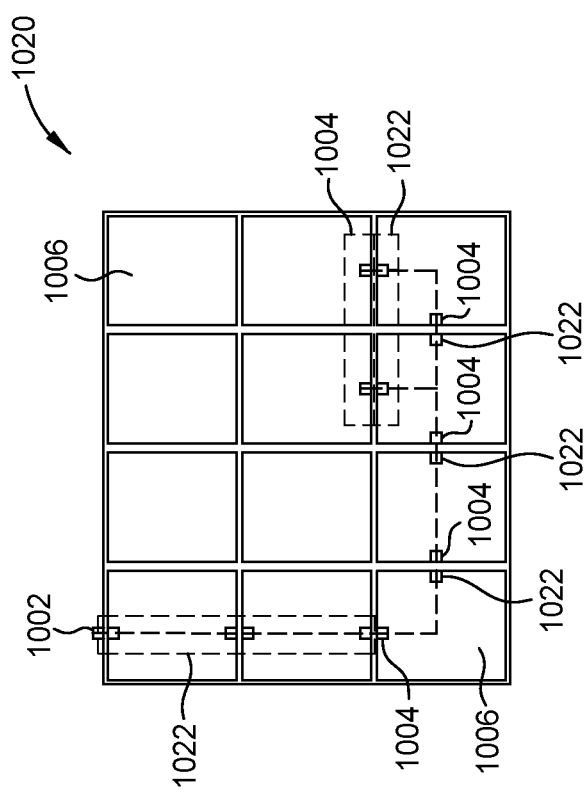

FIG. 10 illustrates a high level clock network 1000, the clock network 1010, and the clock network 1020, according to one or more examples. The clock network 1000 includes clock port 1002 and clock sinks 1004. The clock port 1002 is connected to each of the clock sinks 1004. The clock sinks 1004 are in different ones of the circuit blocks 1006 of the IC chip design. The clock network 1010 includes the clock port 1002, the clock sinks 1004, and the feedthrough pins 1012. The clock network 1020 includes the clock port 1002, the clock sinks 1004, and the feedthrough pins 1022. The feedthrough pins 1012 and 1022 provide connections between the clock port 1002 and the clock sinks 1004. The feedthrough pins 1012 and 1022 and the clock sinks 1004 are in the circuit blocks 1006. The clock network 1020 includes one or more common clock paths determined as is described with regard to FIGS. 7A-7B. As compared to the clock network 1010, the number of feedthrough pins 1022 is less than the number of feedthrough pins 1012, decreasing the corresponding manufacturing cost. Further, as common clock path or paths of the clock network 1020 has a longer shared length between multiple clock sinks 1004 as compared to the clock network 1010, the delay variables are reduced, improving the accuracy of the delay calculation of clock network 1020 and the budgeting determination process as compared to the clock network 1010.

FIG. 11 illustrates an example IC chip design 1100, according to one or more examples. The IC chip design 1100 includes clock port 1102, pin 1104, clock sinks 1106, and blocks (e.g., circuit blocks) 1110-1118. The placement and number of pins (e.g., existing and feedthrough pins) 1104 is determined based on the method 300 of FIG. 3 or the method 400 of FIG. 4. The clock port 1102 is connected to each of the clock sinks 1106 via the pins 1104. The clock sink 1106a is connected to the clock port 1102 via the pin 1104a. The clock sink 1106b is connected to the clock port 1102 via the pin 1104b. The clock sink 1106c is connected to the clock port 1102 via the pin 1104c. The clock sink 1106e is connected to the clock port 1102 via the pin 1104c, the feedthrough pin 1104d, and the pin 1104e. The clock sink 1106f is connected to the clock port 1102 via the pin 1104c, the feedthrough pin 1104d, and the pin 1104f. Accordingly, the clock sink 1106e and the clock sink 1106f are both connected to, e.g., share, the feedthrough pin 1104d.

FIG. 12 illustrates a table 1200 including example latency information, e.g., delay and CRPR values) for the IC chip design 1100 determined by the method 300 of FIG. 3 or the method 400 of FIG. 4. For example, the table 1200 includes the delay and CRPR values between clock sinks 1106 of different circuit blocks 1112. In one example, the delay and CRPR values are determined based on applying method 300 or the method 400 to the IC chip design 1100. The table 1200 is stored within the memory 140 by the CTP engine 120 and accessed by the budget engine 130 to determine a budget for the corresponding IC chip design.

Figure 13:
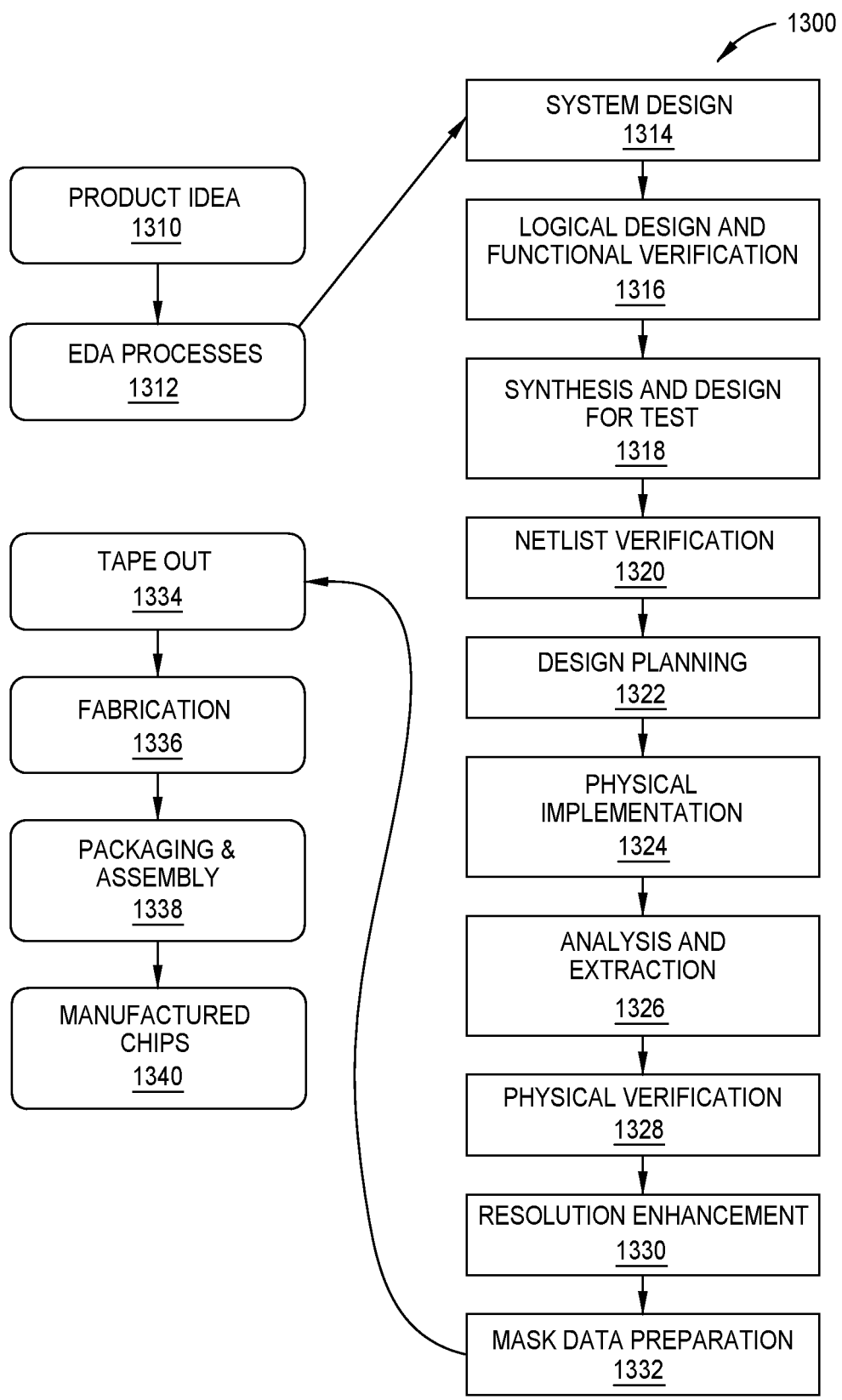
FIG. 13 depicts a flowchart of various processes used during the design and manufacture of an integrated circuit in accordance with some embodiments of the present disclosure.

FIG. 13 illustrates an example set of processes 1300 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 1310 with information supplied by a designer, information which is transformed to create an article of manufacture that uses a set of EDA processes 1312. When the design is finalized, the design is taped-out 1334, which is when artwork (e.g., geometric patterns) for the integrated circuit is sent to a fabrication facility to manufacture the mask set, which is then used to manufacture the integrated circuit. After tape-out, a semiconductor die is fabricated 1336 and packaging and assembly processes 1338 are performed to produce the finished integrated circuit 1340.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 13. The processes described by be enabled by EDA products (or tools).

During system design 1314, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 1316, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 1318, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1320, the netlist is checked for compliance with timing constraints and for correspondence with the HDL code. During design planning 1322, an overall floor plan for the integrated circuit is constructed and analyzed for timing and top-level routing.

During layout or physical implementation 1324, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 1326, the circuit function is verified at the layout level, which permits refinement of the layout design. During physical verification 1328, the layout design is checked to ensure that manufacturing constraints are correct, such as DRC constraints, electrical constraints, lithographic constraints, and that circuitry function matches the HDL design specification. During resolution enhancement 1330, the geometry of the layout is transformed to improve how the circuit design is manufactured.

During tape-out, data is created to be used (after lithographic enhancements are applied if appropriate) for production of lithography masks. During mask data preparation 1332, the 'tape-out' data is used to produce lithography masks that are used to produce finished integrated circuits.

A storage subsystem of a computer system (such as computer system 1400 of FIG. 14) may be used to store the programs and data structures that are used by some or all of the EDA products described herein, and products used for development of cells for the library and for physical and logical design that use the library.

Figure 14:
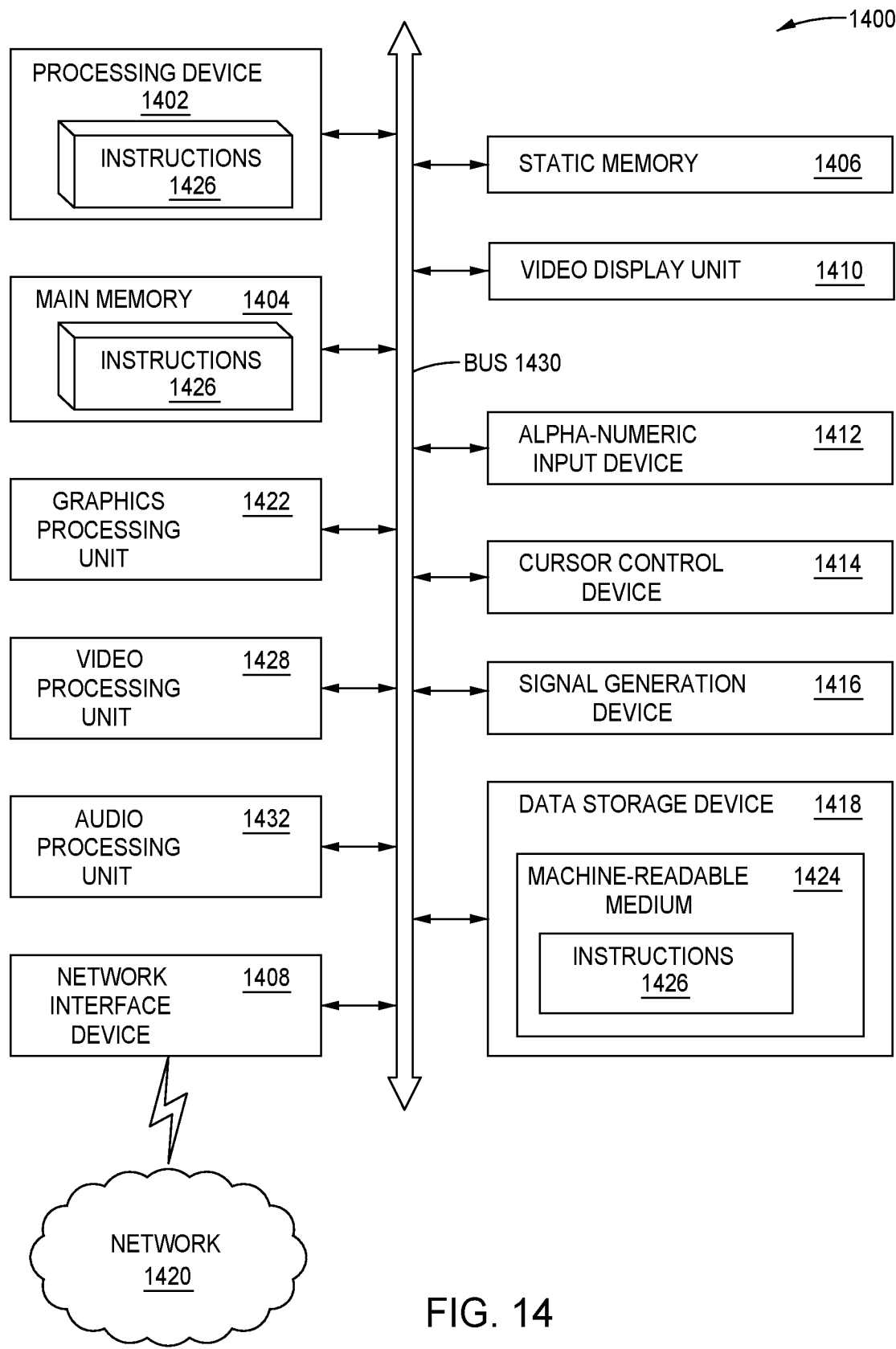
FIG. 14 depicts an abstract diagram of an example computer system in which embodiments of the present disclosure may operate.

FIG. 14 illustrates an example machine of a computer system 1400 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1400 includes a processing device 1402, a main memory 1404 (e.g., read-only memory (ROM), flash memory, dynamic random access memory (DRAM) such as synchronous DRAM (SDRAM), a static memory 1406 (e.g., flash memory, static random access memory (SRAM), etc.), and a data storage device 1418, which communicate with each other via a bus 1430.

Processing device 1402 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1402 may also be one or more special-purpose processing devices such as an application specific integrated circuit (ASIC), a field programmable gate array (FPGA), a digital signal processor (DSP), network processor, or the like. The processing device 1402 may be configured to execute instructions 1426 for performing the operations and steps described herein.

The computer system 1400 may further include a network interface device 1408 to communicate over the network 1420. The computer system 1400 also may include a video display unit 1410 (e.g., a liquid crystal display (LCD) or a cathode ray tube (CRT)), an alphanumeric input device 1412 (e.g., a keyboard), a cursor control device 1414 (e.g., a mouse), a graphics processing unit 1422, a signal generation device 1416 (e.g., a speaker), graphics processing unit 1422, video processing unit 1428, and audio processing unit 1432.

The data storage device 1418 may include a machine-readable storage medium 1424 (also known as a non-transitory computer-readable medium) on which is stored one or more sets of instructions 1426 or software embodying any one or more of the methodologies or functions described herein. The instructions 1426 may also reside, completely or at least partially, within the main memory 1404 and/or within the processing device 1402 during execution thereof by the computer system 1400, the main memory 1404 and the processing device 1402 also constituting machine-readable storage media.

In some implementations, the instructions 1426 include instructions to implement functionality corresponding to the present disclosure. While the machine-readable storage medium 1424 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1402 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
    receiving a circuit design including blocks, a clock port, and two or more clock sinks across the blocks;
    determining, by one or more processors, a common clock path between the clock port and the two or more clock sinks across the blocks by selecting the common clock path from two or more common clock paths based on a number of feedthrough pins; and
    determining a clock latency based on the common clock path.

2. The method of claim 1, determining the common clock path comprises:
    determining block connectivity between adjacent ones of the blocks within the circuit design, wherein selecting the common clock path based on the number of the feedthrough pins comprises selecting the common clock path based on the block connectivity.

3. The method of claim 2, wherein selecting the common clock path based on the number of the feedthrough pins comprises selecting the common clock path from two or more common clock paths with a lowest associated number of feedthrough pins.

4. The method of claim 2, wherein the common clock path includes a pin of a first block of the blocks connected to the two or more clock sinks.

5. The method of claim 1, wherein the common clock path has a common point connected to the two or more clock sinks across the blocks.

6. The method of claim 5, wherein determining the clock latency comprises determining a delay between the clock port and the common point.

7. The method of claim 1 further comprising outputting the clock latency to a budgeting engine configured to determine a timing budget for the circuit design based on the clock latency.

8. A system comprising:
    a memory; and
    a processor coupled to the memory, the processor configured to:
        receive a design file including blocks, a clock port, and two or more clock sinks across the blocks;
        determine, by one or more processors, a common clock path between the clock port and the two or more clock sinks across the blocks by selecting the common clock path from two or more common clock paths based on a number of feedthrough pins; and
        determine a clock latency based on the common clock path.

9. The system of claim 8, wherein determining the common clock path comprises:
    determining block connectivity between adjacent ones of the blocks within the design file, wherein selecting the common clock path based on the number of the feedthrough pins comprises selecting the common clock path based on the block connectivity.

10. The system of claim 9, wherein selecting the common clock path based on the number of the feedthrough pins comprises selecting the common clock path from two or more common clock paths with a lowest associated number of feedthrough pins.

11. The system of claim 10, wherein the common clock path includes pin of a first block of the blocks connected to the two or more clock sinks.

12. The system of claim 8, wherein the common clock path has a common point connected to the two or more clock sinks across the blocks.

13. The system of claim 12, wherein determining the clock latency comprises determining a delay between the clock port and the common point.

14. The system of claim 8 comprising a budgeting engine configured to receive the clock latency and determine a timing budget based on the clock latency.

15. A non-transitory computer readable medium comprising stored instructions, which when executed by a processor, cause the processor to:
    receive a design file including blocks, a clock port, and two or more clock sinks across the blocks;
    determine a common clock path between the clock port and the two or more clock sinks across the blocks by selecting the common clock path from two or more common clock paths based on a number of feedthrough pins; and
    determine a clock latency based on the common clock path.

16. The non-transitory computer readable medium of claim 15, wherein determining the common clock path comprises:
    determining block connectivity between adjacent ones of the blocks within the design file, wherein selecting the common clock path based on the number of the feedthrough pins comprises selecting the common clock path based on the block connectivity.

17. The non-transitory computer readable medium of claim 16, wherein selecting the common clock path based on the number of the feedthrough pins comprises selecting the common clock path from two or more common clock paths with a lowest associated number of feedthrough pins.

18. The non-transitory computer readable medium of claim 17, wherein the common clock path includes a pin of a first block of the blocks connected to the two or more clock sinks.

19. The non-transitory computer readable medium of claim 17, wherein the common clock path has a common point connected to the two or more clock sinks across the blocks.

20. The non-transitory computer readable medium of claim 19, wherein determining the clock latency comprises determining a delay between the clock port and the common point.

\* \* \* \* \*